United States Patent [19]
Ohnishi et al.

[11] Patent Number: 5,969,963
[45] Date of Patent: Oct. 19, 1999

[54] POWER CONVERTING DEVICE SUPPLYING AC VOLTAGE OF A CONTINUOUS WAVE FORM

[75] Inventors: Masahito Ohnishi; Hiroshi Ogasawara, both of Kadoma, Japan

[73] Assignee: Matsushita Electric Works, Ltd., Osaka, Japan

[21] Appl. No.: 09/006,951

[22] Filed: Jan. 14, 1998

[30] Foreign Application Priority Data

Jan. 14, 1997 [JP] Japan ................................. 9-005065
Jan. 14, 1997 [JP] Japan ................................. 9-005066

[51] Int. Cl.⁶ .............................................. H02M 7/5387
[52] U.S. Cl. ........................................... 363/132; 363/60
[58] Field of Search ................................ 363/60, 59, 131, 363/132, 133; 315/224, 307; 310/318

[56] References Cited

U.S. PATENT DOCUMENTS

| | | | |
|---|---|---|---|
| 5,548,189 | 8/1996 | Williams | 315/224 |
| 5,675,484 | 10/1997 | Shimada | 363/71 |
| 5,705,877 | 1/1998 | Shimada | 310/318 |
| 5,761,058 | 6/1998 | Kanda et al. | 363/60 |

FOREIGN PATENT DOCUMENTS 8-47265  2/1996  Japan .

*Primary Examiner*—Adolf Deneke Berhane
*Attorney, Agent, or Firm*—Burns, Doane, Swecker & Mathis, L.L.P.

[57] ABSTRACT

A power converting device includes at least power source section providing a pulsation voltage output of a stepped waveform, and a piezo-electric element for shaping output voltage waveform of the power source section substantially into a sinusoidal waveform and boosting and dropping output voltage value of the power source section. A fundamental wave component of the piezo-electric element is transformed by a boosting and dropping element and a filter element to be applied to a load, whereby it is enabled to apply to the load a required voltage of a substantially continuous waveform, without employing any element of high withstand voltage nor decreasing power conversion efficiency.

8 Claims, 10 Drawing Sheets

POWER CONVERTING DEVICE SUPPLYING AC VOLTAGE OF A CONTINUOUS WAVE FORM

BACKGROUND OF THE INVENTION

This invention relates to a power converting device enabled to apply to a load an AC voltage of a required voltage level and substantially of a continuous waveform with use of a power source section which generates an AC voltage of a stepped waveform.

DESCRIPTION OF RELATED ART

As conventional power converting device, there may be enumerated such one as has been disclosed in U.S. Pat. No. 5,761,058 Kanda et al.

This known power converting device comprises a cell formed by capacitors as a voltage source and a bridge circuit for inverting the polarity of the capacitors, a stepped waveform producing circuit formed by a series connection of more than one set of the cells, a filter circuit for filtering an output of the waveform producing circuit, a load connected to an output end of the filter circuit, and a charging circuit for charging the capacitors from a DC power source in parallel relationship, wherein the capacitors are arranged for controlling an AC power supply to the load by means of a series connection of the capacitors in an optional number and in optional polarity.

According to this known power converting device, a plurality of the capacitors are employed so that, upon discharge of the respective capacitors, a stepped voltage is produced by controlling the number of the capacitors to be connected in series, the applied voltage to waveform-shaping inductor, capacitors and switching elements is lowered by outputting the stepped voltage as rendered to be substantially in sinusoidal waveform, and a low noise power capable of minimizing the device to be thin type can be supplied to the load by supplying a voltage of sinusoidal waveform with an inductance of a small value, as an advantage of this known device.

Figure 14:
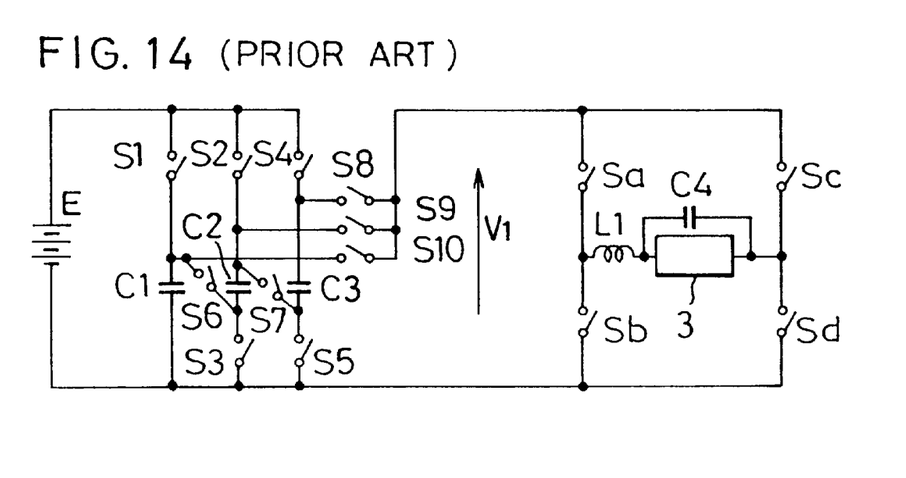
FIG. 14 is a circuit diagram of one of conventional power converting device.

Theoretical operation of the above known device shall be explained with reference to such circuit example as shown in FIG. 14 with a reduced number of parts.

This known power converting device of FIG. 14 is shown to be provided with three capacitors C1–C3. A charging switching element S1 is inserted between a positive pole of a DC power source E and the capacitor C1, and charging switching elements S2–S5 are respectively inserted between the capacitors C2 and C3 and both poles of the DC power source E. Further, discharging switching elements S8–S10 are provided as connected at one end respectively to each of junction points of the capacitors C1–C3 and charging switching elements S1, S2 and S4 and at the other end in common, and further discharging switching elements S6 and S7 are connected respectively between positive pole of the capacitor C1 and negative pole of the capacitor C2 and between positive pole of the capacitor C2 and negative pole of the capacitor C3. ON/OFF timing of these charging switching elements S1–S5 and of the discharging switching elements S6–S10 are controlled by a well-known, optimum control circuit (not shown), and a potential at a junction point in the common connection of the discharging switching elements S8–S10 is varied stepwise.

On the other hand, an inverter circuit is formed by a bridge connection of further switching elements Sa–Sd, and a series circuit of a load 3 and an inductor L1 is connected between both junctions points of the switching elements Sa and Sb and of the switching elements Sc and Sd at their arms in series connection of the respective switching elements Sa–Sd, while a capacitor C4 is connected in parallel to the load 3. In this case, a control is so made that there is present a period in which the switching elements Sa and Sd or Sb and Sc disposed at diagonal positions of the bridge circuit are simultaneously made ON, and the switching elements Sa and Sb nor Sc and Sd are not simultaneously made ON, and the polarity of applied voltage to the load 3 is caused to alternate, by having a period in which the switching elements Sa and Sd are made simultaneously ON and a period in which the switching elements Sb and Sc are made simultaneously ON generated alternately. The ON/OFF operation of these switching elements Sa–Sd is controlled by a control circuit, similarly to the capacitor charging or discharging switching elements S1–S5 or S6–S10 for switched capacitors.

Therefore, it is possible to generate the voltage varying stepwise and to cause the polarity of applied voltage to the load 3 to alternate through the inverter circuit, and it is enabled to apply to the series circuit of L1 and load 3 the AC voltage of the sinusoidal waveform varying stepwise (that is, to be a discontinuous waveform) by properly controlling the inverter circuit.

Figure 15:
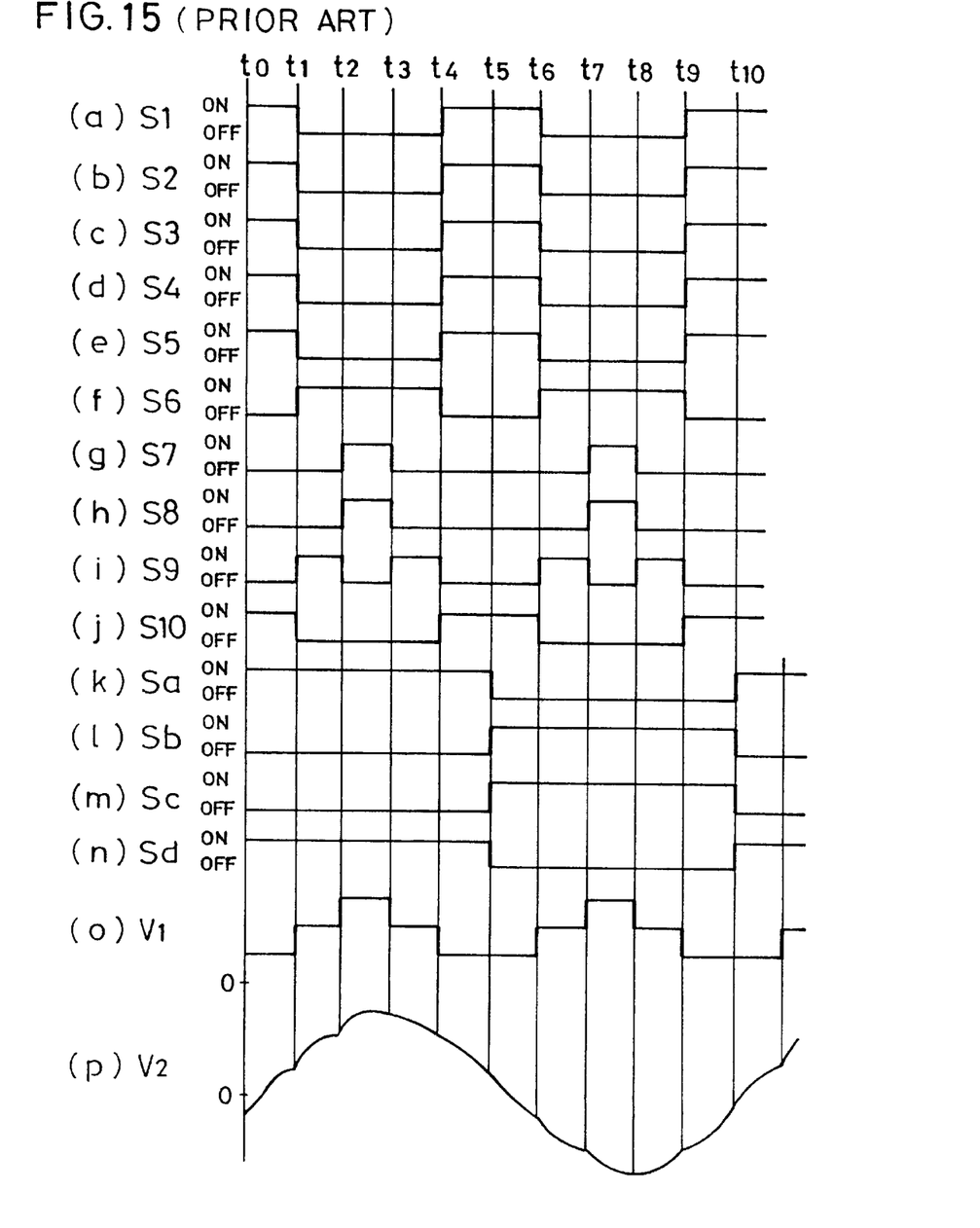

On the other hand, the control circuit controls the respective charging switching elements S1–S5, discharging switching elements S6–S10 and further switching elements Sa–Sd, at such timings as shown in FIG. 15. Now, the operation shall be described in the assumption that the circuit shown in FIG. 14 is in a stationary operation. First, at time t0, the charging switching elements S1–S5 are all made ON, and the discharging switching element S10 is also made ON, upon which a both-end voltage of the respective capacitors C1–C3 is charged to a level substantially conforming to a both-end voltage of the DC power source E, and a voltage V1 applied to the inverter circuit will be substantially equal to the voltage of the DC power source E, as shown in FIG. 15(o).

At time ti, next, all charging switching elements S1–S5 are made OFF, and the discharging switching elements S6 and S9 only are made ON, whereby the capacitors C1 and C2 are connected in series, and the voltage V1 is made to be substantially twice as high as the both-end voltage of the source E. At time t2, the discharging switching element S9 in this state is made OFF and the switching elements S7 and S8 are made ON, so that all capacitors C1–C3 will be connected in series, and the voltage V1 will be substantially three times as high as the both end voltage of the source E.

At time t3, the same state as the time t1 is set and, at time t4, the same state as the time t0 is set. At time t5, the state of the time t4 is maintained as it is. Thereafter, the foregoing operation is repeated, and the voltage V1 is made to be of a pulsating waveform in which the voltage drops and rises in stepwise as shown in FIG. 15(o).

The switching elements Sa–Sd forming the inverter circuit, as shown in FIGS. 15(k) to 15(n), the polarity of the applied voltage to the series circuit of the inductor L1 and capacitor C4 is inverted at every series of operation of the foregoing charging switching elements S1–S5 and discharging switching elements S6–S10 in the period t0–t5. That is, in the period t0–t5, the switching elements Sa and Sd are ON but the switching elements Sb and Sc are made OFF, and, in the period t5–t10, the switching elements Sa and Sd are OFF but the switching elements Sb and Sc are ON. In this manner, the voltage applied to the series circuit of the inductor L1 and capacitor C4 is caused to vary stepwise, and the voltage varies as a whole to be a sinusoidal, alternating waveform.

As is clear from the foregoing description, the charging and discharging switching elements S1–S5 and S6–S10 and the switching elements Sa–Sd forming the inverter circuit are so controlled as to mutually interlock. Further, since it is possible to easily vary the cycle of the voltage applied to the series circuit of the inductor L1 and capacitor C4 by varying time interval of switching ON/OFF combination of the respective switching elements S1–S10 and Sa–Sd, it is possible to constitute a power source section made variable in the output frequency with the above formation.

Here, while the voltage applied to the series circuit of the inductor L1 and capacitor C4 varies stepwise, the inductor L1 and capacitor C4 function as a filter circuit, and it is possible to apply to the load 3 such AC voltage V2 of sinusoidal waveform varying substantially continuously as shown in FIG. 15(p).

With this circuit formation, it is enabled to minimize the charging and discharging energy at every time of the respective capacitors C1–C3 by increasing the switching frequency of the switching elements S1–S10 and Sa–Sd, so that the capacity of the capacitors C1–C3 can be minimized, and it is enabled to provide a small power converting device.

Further, as another conventional device employing a piezo-electric transformer, such one as has been disclosed in Japanese Patent Laid-Open Publication No. 8-47265 will be enumerated, in which two switching elements are alternately made ON and OFF to supply to input side of the piezo-electric transformer a square wave, and to obtain as an output a sinusoidal waveform of a frequency in accordance with a natural oscillation frequency of the piezo-electric transformer.

Now, in the foregoing device as shown in FIGS. 14 and 15, there is taken a measure for a use of the load 3 which requires an application of a high voltage, by raising the both-end voltage of the DC power source E or by increasing the number of capacitors to be connected in series for discharging. In the former case, however, the charging switching elements S1–S5 and discharging switching elements S6–S10 are required to be of a high withstand voltage, so that there arises a problem that elements of a larger size are required to render the device to be enlarged. In the latter case, further, required number of parts is increased to render the device to be larger in size, and the number of the discharging switching elements to be connected in series upon discharging of the capacitors has to be increased, so that a loss due to a resistance component of the discharging switching element will be enlarged to lower the power conversion efficiency.

In regulating the voltage applied to the load 3 in the above device, it may be possible to arrange the output voltage of the DC power source E to be variable as shown in FIG. 14. When the output voltage of the DC power source E is made thus variable, however, the DC power source E is required to be of a specific arrangement to cause a problem to arise in that the device has to be enlarged, the power conversion efficiency is decreased and so on.

In an event where the piezo-electric transformer is used, further, there is a problem that a rush current is caused to flow to the equivalent capacitors of input so as to lower the efficiency.

SUMMARY OF THE INVENTION

An object of the present invention is to overcome the foregoing problems in the known devices, and to provide a power converting device which renders the applied voltage to the load to be of a substantially continuous waveform, and which does not employ any high withstand voltage element for applying a required voltage to the load, or does not lower the power conversion efficiency.

Further, an object of the present invention is to provide a power converting device in which an arrangement for controlling the output voltage waveform of the power source section is employed, instead of any special arrangement as the DC power source, so that the supplied power to the load can be regulated without causing the device to be enlarged or to be decreased in the power conversion efficiency.

Other objects and advantages of the present invention shall become clear as the description advances with reference to working aspects of the invention as shown in accompanying drawings.

BRIEF DESCRIPTION OF THE DRAWINGS

FIGS. 2a–q show operational waveform diagrams at respective parts in the circuit of FIG. 1;

FIGS. 9a–v show waveform diagrams at respective parts in the circuit of FIG. 8;

FIGS. 12a–12c are circuit examples of impedance element employed in the device of FIG. 11;

FIGS. 15a–p show operational waveforms at respective parts in the circuit of FIG. 14;

While the present invention shall now be described with reference to the respective working aspects shown in the accompanying drawings, it should be appreciated that the intention is not to limit the invention only to these working aspects, but rather to include all alterations, modifications and equivalent arrangements possible within the scope of appended claims.

DETAILED DESCRIPTION OF THE PREFERRED EMBODIMENTS

Figure 1:
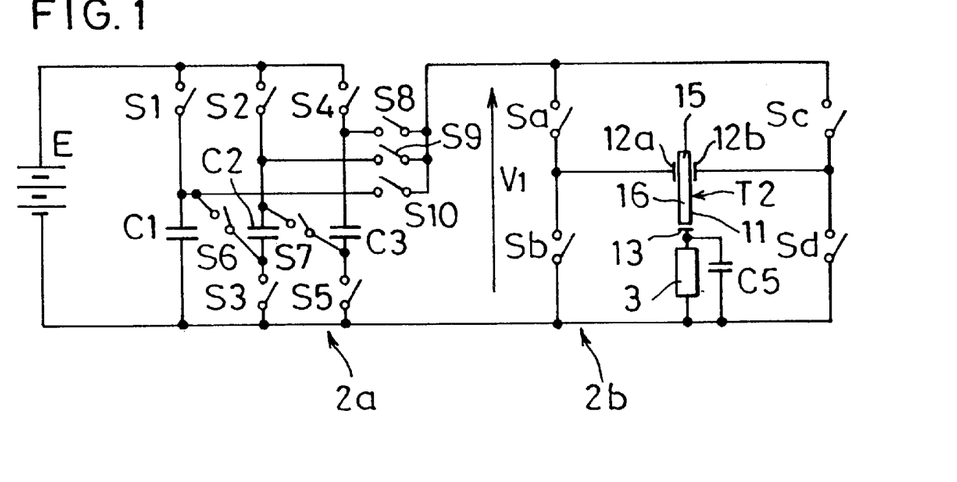
FIG. 1 is a circuit diagram of the power converting device according to the present invention.

A working aspect of the power converting device according to the present invention is shown in FIG. 1, in which the device is featured in the use of a piezo-electric transformer T2 and a connection of a capacitor C5 in parallel with a load 3, in contrast to the prior art.

The piezo-electric transformer T2 comprises a piezo-electric element 11 of a rectangular parallelopiped shape and provided on both sides at one end part in longitudinal direction with a pair of mutually opposing input electrodes 12a and 12b and at the other end face in the longitudinal direction with an output electrode 13. The one end part of the element 11 disposed between the input electrodes 12a and 12b functions as a driving section 15, and the remaining part between the driving section 15 and the output electrode 13 forms a generating section 16.

Further, the piezoelectric transformer T2 is so arranged that a mechanical oscillation is yielded by the piezo-electric element 11 with an application of an AC voltage to the driving section 15, and a voltage generated by this mechanical oscillation is taken out through the output electrode 13. Since the mechanical oscillation involves an inertia, the driving section 15 is to function equivalently as a filter circuit. Further, the piezo-electric transformer T2 has a resonance frequency in accordance with a dimension of length of the generating section 16, and it is enabled to obtain the voltage through the output electrode 13 as remarkably boosted, by resonating the piezo-electric element 11 with an application through the input electrodes 12a and 12b of a voltage at a frequency close to the resonance frequency of the transformer.

The piezo-electric transformer T2 thus has both functions of a filter element and of a boosting element, and it is not required to provide any separate element for constituting the filter element. Further, as compared with a transformer formed by means of windings on an iron core, the piezo-electric transformer T2 enables the transformer to be minimized in size, and is contributive to a minimization in size of the entire device and to a realization of a reduction of height (to be thin type).

Figure 2:
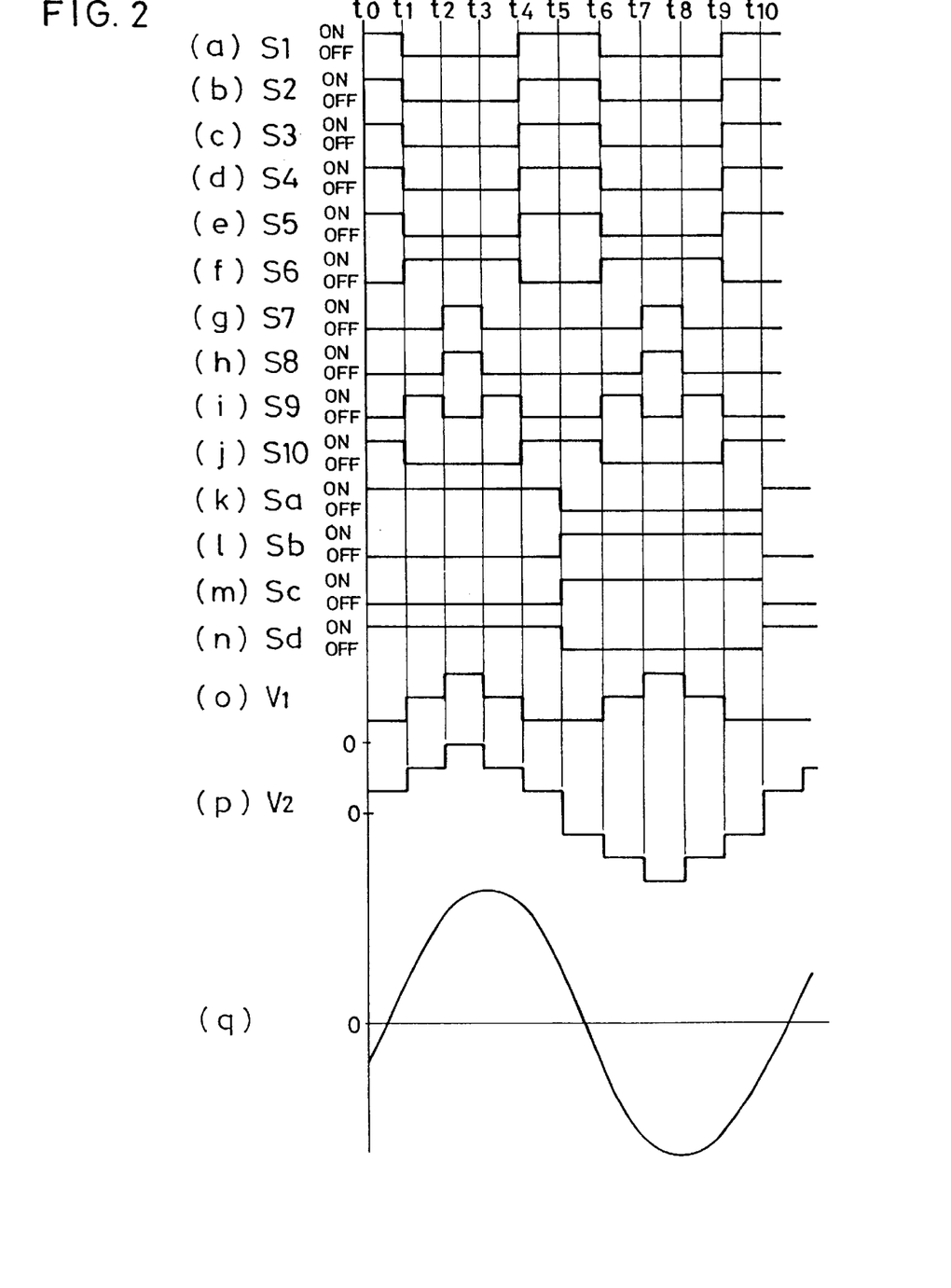

Respective switching elements S1–S10 and Sa–Sd in the working aspect of FIG. 1 are controlled at such timing as shown in FIG. 2, by means of a control circuit (not shown) which per se has been well known. This timing is the same as the timing in the case of the known device shown in FIG. 15. That is, an output voltage V1 of a first power source section 2a occurs in the same manner as in the known device, as in FIG. 2(o), and an output voltage of a second power source section 2b is also the same stepwise, sinusoidal AC waveform as that in the known device, as in FIG. 2(p). Here, it is made possible to apply such boosted voltage of sinusoidal waveform as shown in FIG. 2(q) to the load 3, by applying the voltage to the load 3 through the piezo-electric transformer T2. Because of the stepwise voltage variation, the varying voltage value is decreased, and any rush current value flowing to the equivalent capacitor of the piezo-electric transformer is remarkably reduced. Other arrangements and operation are the same as those in the known device of FIG. 15.

Figure 3:
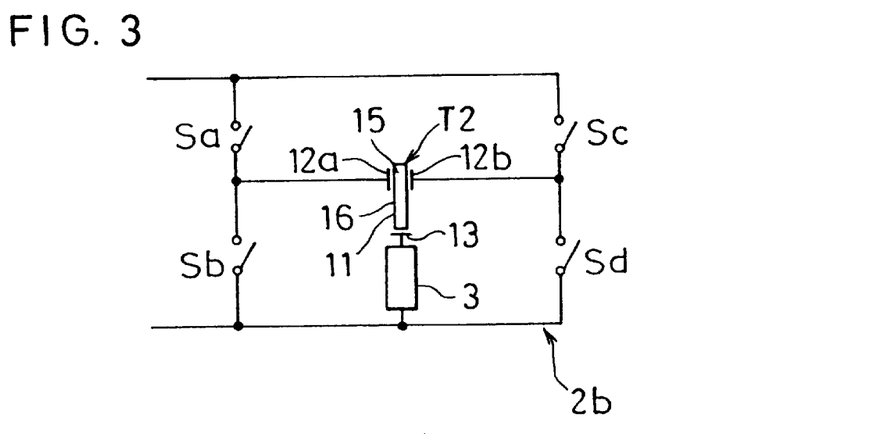
FIGS. 3–5 are partial circuit diagrams in other working aspects of the present invention, respectively.

In another working aspect of the present invention as shown in FIG. 3, the capacitor C5 connected in parallel with the load 3 in the aspect of FIG. 1 is omitted. With this arrangement, it is made possible to apply the AC voltage of the continuous waveform to the load 3 even in the absence of the capacitor C5 and to supply a low noise power, by rendering an output frequency of the second power source section 2b to be in conformity to the resonance frequency of the generating section 16 of the piezo-electric transformer T2. Other arrangements and operation are the same as those in the working aspect of FIG. 1.

Figure 4:
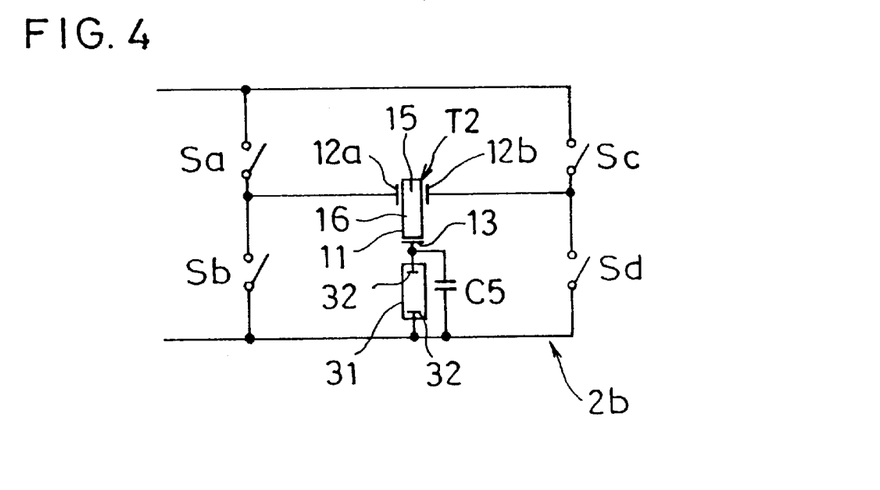

In another working aspect of the present invention as shown in FIG. 4, the load 3 in the formation of the working aspect in FIG. 1 comprises a discharge lamp 31 provided with cold cathodes 32. While this formation requires a high voltage for starting the discharge lamp 31, the output voltages of the first and second power source sections 2a and 2b may be low, and elements employed for forming these power source sections 2a and 2b are not required to be of a high withstand voltage, allowing thus high voltages to be obtained even with elements of a low withstand voltage employed. Other arrangements and operation are the same as those in the working aspect of FIG. 1.

Figure 5:
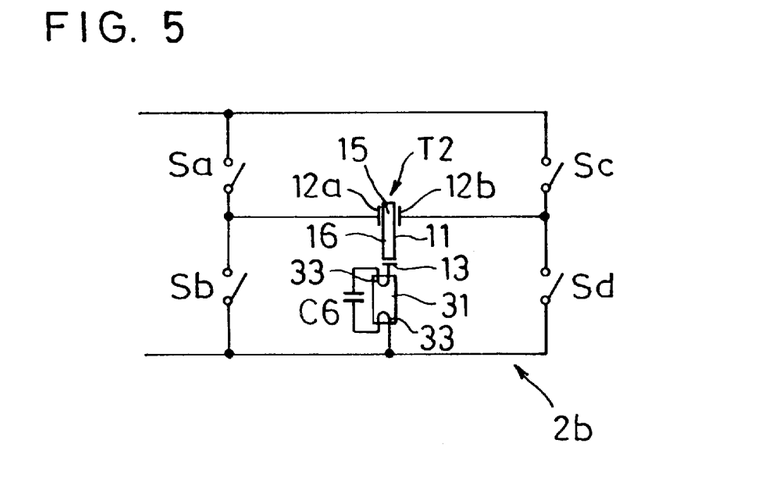

In another working aspect of the present invention as shown in FIG. 5, the load 3 in the formation of FIG. 1 comprises a discharge lamp 31 having cathodes (filaments) 33, and a capacitor C6 is connected across one ends of both filaments 33. Therefore, in preheating the cathodes while the lamp is not lighted, it is enabled to heat the filaments by causing a current to flow thereto through the capacitor C6 and, thereafter, the discharge lamp 31 can be started by applying to the lamp 31 the high voltage boosted by the piezo-electric transformer T2. Other arrangements and operation are the same as those in the working aspect of FIG. 1.

Figure 6:
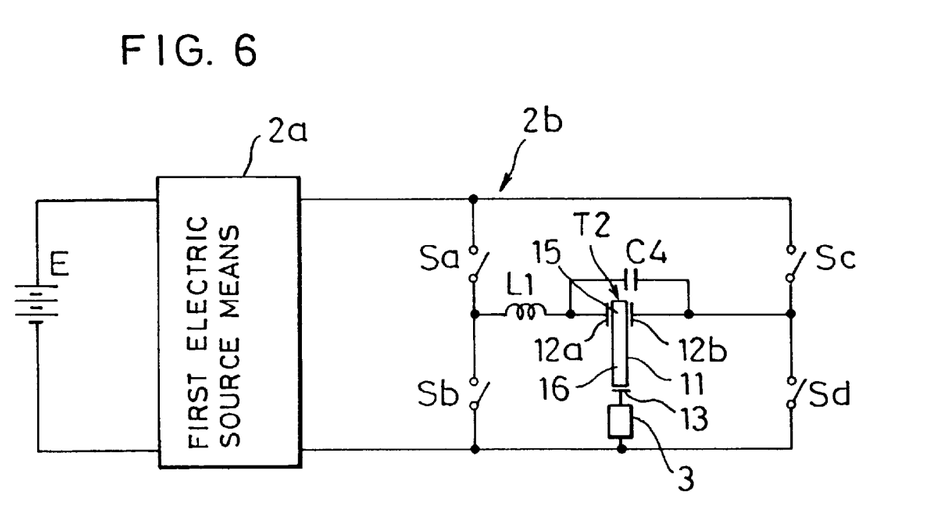
FIGS. 6–8 are circuit diagrams of other working aspects of the present invention, respectively.

In another working aspect of the present invention as shown in FIG. 6, a capacitor C4 is connected in parallel with a primary side of the piezoelectric transformer T2 in the formation of the aspect shown in FIG. 3, and a series circuit of this capacitor C4 and an inductor L1 is connected across output ends of the second power source 2b. Since in general the piezo-electric transformer T2 has an input capacity component (equivalent capacitor), there is the possibility that a rush current flows upon application of the output voltage of the second power source section 2b, whereas, in the circuit formation of this working aspect, a choke input type circuit is formed by the series connection of the small inductor L1 with respect to the parallel circuit of the piezo-electric transformer T2 and capacitor C4, the varying voltage value is reduced with the effect of the stepped waveform, and the rush current can be reduced. Accordingly, it is possible to prevent any stress or noise due to the rush current from occurring. Other arrangements and operation are the same as those in the aspect of FIG. 1.

Figure 7:
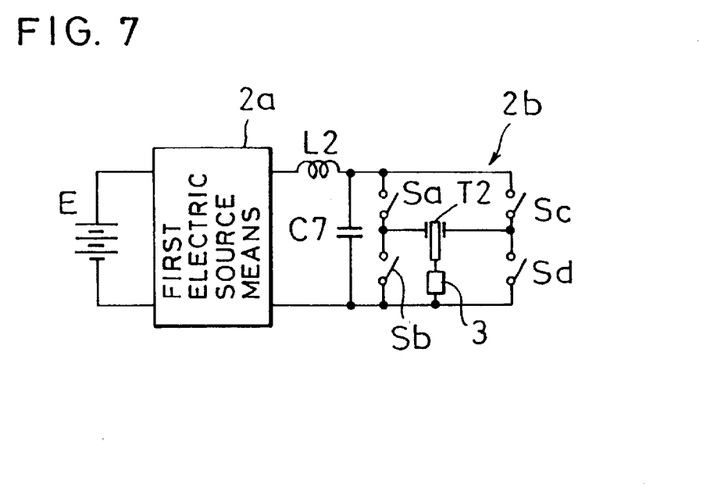

In another working aspect of the present invention as shown in FIG. 7, a filter circuit comprising an inductor L2 and capacitor C7 is provided between the first and second power source sections 2a and 2b in the formation shown in FIG. 3. This filter circuit is a low-pass filter of a choke-input type and has a function of slightly smoothing a stepped, discontinuous voltage waveform of an output of the first power source section 2a, and a function of reducing the rush current to the piezo-electric transformer T2. Therefore, similarly to the working aspect of FIG. 6, it is possible to prevent any stress or noise from occurring due to the rush current. Other arrangements and operation are the same as those in the working aspect of FIG. 1.

Figure 8:
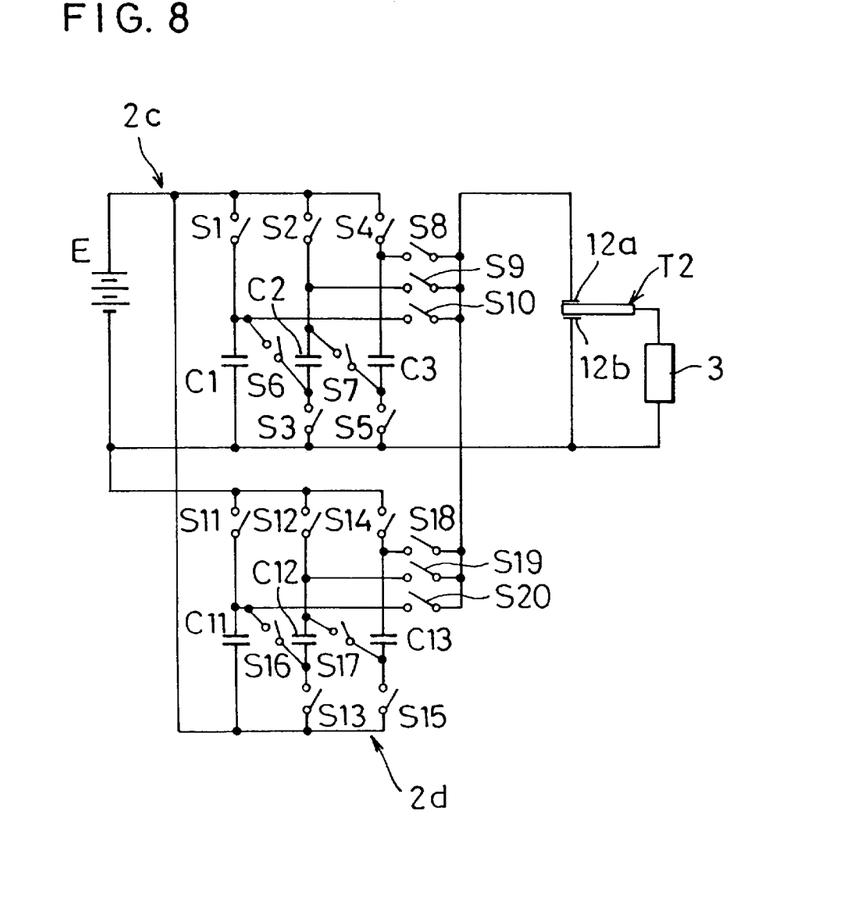

In another working aspect of the present invention as shown in FIG. 8, the formation is so made that the power source section capable of obtaining the output voltage of the stepped and sinusoidal AC waveform can be obtained can be realized without employing an inverter circuit. That is, the same positive power source section 2c and negative power source section 2d as those shown in the known example of FIG. 14 are provided, while these positive and negative power source sections 2c and 2d are made mutually opposite in their connecting polarity to the DC power source E. Therefore, as has been described with reference to the known example, the output voltage of the stepped and pulsating waveform is obtained at positive potential from the positive power source section 2c, and an output voltage of the stepped and pulsating waveform but in an inverted polarity can be obtained from the negative power source section 2d. That is, by having the positive and negative power source sections 2c and 2d operated alternately, it is enabled to obtain the output of the stepped and sinusoidal AC waveform.

Referring more specifically to the above, the positive power source section 2c itself is of the same formation as that has been referred to in the known example of FIG. 14, and is formed by the capacitors C1–C3 and charging and discharging switching elements S1–S5 and S6–S10, whereas the negative power source section 2d is formed by capacitors C11–C13 and charging and discharging switching elements S11–S15 and S16–S20. While the positive and negative power source sections 2c and 2d are of the same formation, they are different in respect that, in the positive power source section 2c, the capacitor C1 is connected to the negative pole of the DC power source E whereas, in the negative power source section 2d, the capacitor C11 is connected to the positive pole of the source E. Further, an output end to which one ends of the discharging switching elements S8–S10 are connected in common is connected in common to one ends of the discharging switching elements S18–S20. Between the power sections and the load 3, the piezo-electric transformer T2 is inserted, the one ends of the discharging switching elements S8–S10 and S18–S20 are connected in common to one input terminal 12a of the piezo-electric transformer T2, and the negative pole of the DC power source E is connected to the other input terminal 12b of the transformer.

Figure 9:
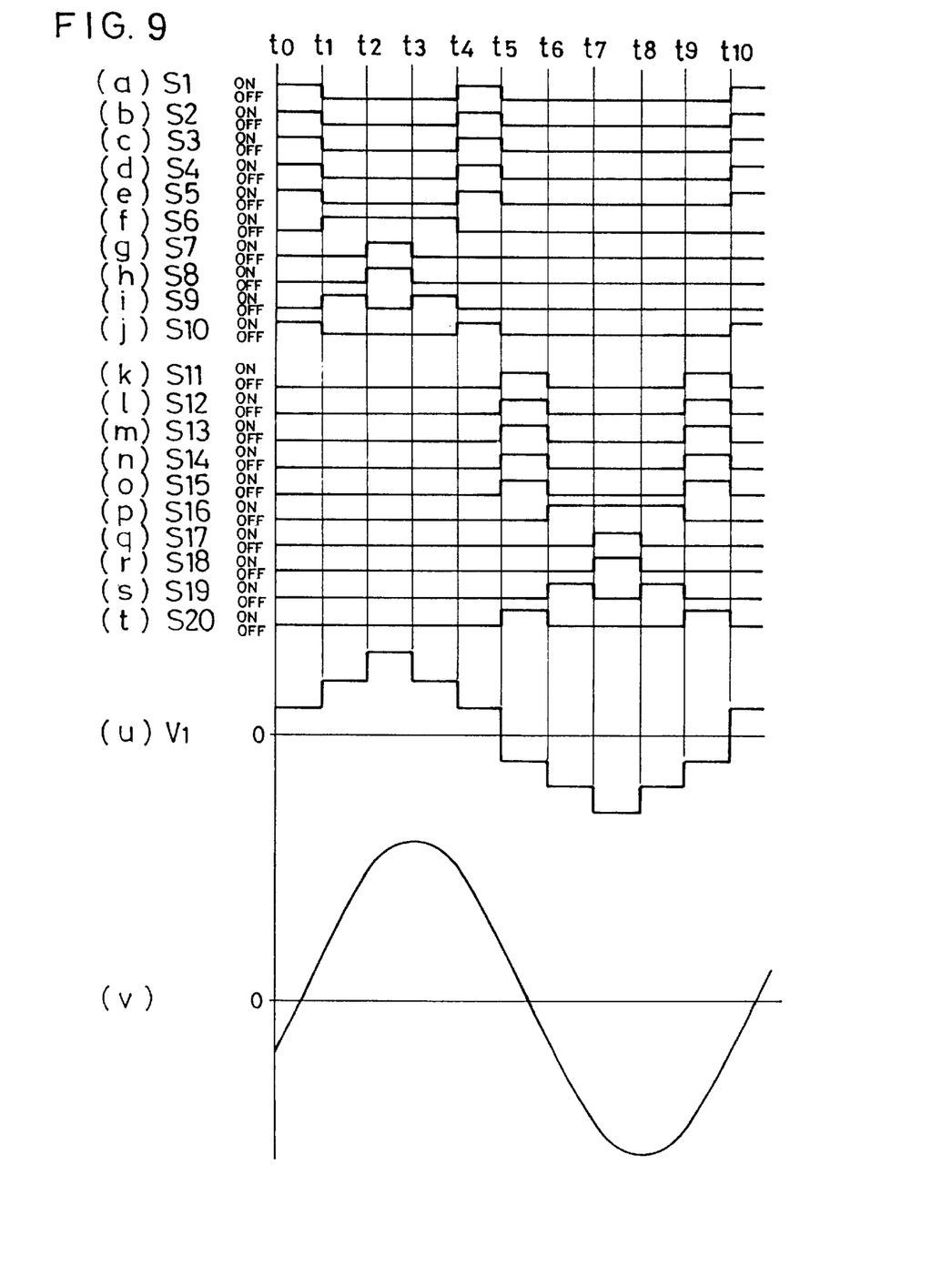

Now, the respective switching elements S1–S20 are controlled by a control circuit (not shown) at such optimum timing of (a)–(t) of FIG. 9. That is, in a period t0–t1, the charging switching elements S1–S5 and discharging switching element S10 are made ON, and a voltage substantially equal to the both-end voltage of the DC power source E as in FIG. 9 (u) is provided as an output. At time t1, next, the charging switching elements S1–S5 and discharging switching element S10 are made OFF, and the discharging switching elements S6 and S9 are made ON, whereby the capacitors C1 and C2 are connected in series, and the output voltage V1 is made substantially twice as high as the both-end voltage of the DC power source E. At time t2, further, the discharging switching element S9 is turned OFF from the above state and the switching elements S7 and S8 are made ON, then the capacitors C1–C3 are all connected in series, and the output voltage V1 is made substantially three times as high as the both end voltage of the DC power source E.

At time t3, the same state as that of time t1 is set and, at time t4, the same state as that of time t0 is set while, at time t5, the state of time t4 is maintained as it is. During the foregoing series of operation, the switching elements S11–S20 are all kept OFF. With such operation, the voltage V1 applied to the input terminals 12a and 12b of the piezo-electric transformer T2 is caused to rise and drop stepwise in the positive polarity as in FIG. 9 (u).

As time t5 is reached, the foregoing operation is performed at the negative power source section 2d so that, in a period t5–t6, the charging switching elements S11–S15 and discharging switching element S20 are made ON, and a negative output voltage substantially equal to the both-end voltage of the DC power source E as in FIG. 9 (u) is provided. At time t6, next, the charging switching elements S11–S15 and discharging switching element S20 are made OFF, and the discharging switching elements S16 and S19 are made ON, whereby the capacitors C11 and C12 are connected in series so that the output voltage V1 will be substantially twice as high as the both-end voltage of the DC power source E. At time t7, further, the discharging switching element S19 is turned OFF from the above state, and the switching elements S17 and S18 are made ON, whereby the capacitors C1–C3 are caused to be all connected in series, and the output voltage V1 becomes substantially three times as high as the both-end voltage of the DC power source E.

For time t8, the same state as that of time t6 is set and, for time t9, the same state as t0 is set. Until time t10, the state of t9 is maintained as it is. During the foregoing series of operation, the switching elements S1–S10 are all kept in OFF state. With the above operation, the voltage V1 applied to the input terminals 12a and 12b of the piezo-electric transformer T2 rises and stops stepwise in the negative polarity as shown in FIG. 9 (u) in the period t5–t10.

With the above operation repeated, it is made possible to obtain the output voltage varying in the stepped and sinusoidal waveform, and it is enabled to apply such high voltage of sinusoidal waveform as shown in FIG. 9 (v) to the load 3 by passing the output voltage through the piezo-electric transformer T2. With this arrangement, too, the power converting device of the low noise can be provided.

Figure 10:
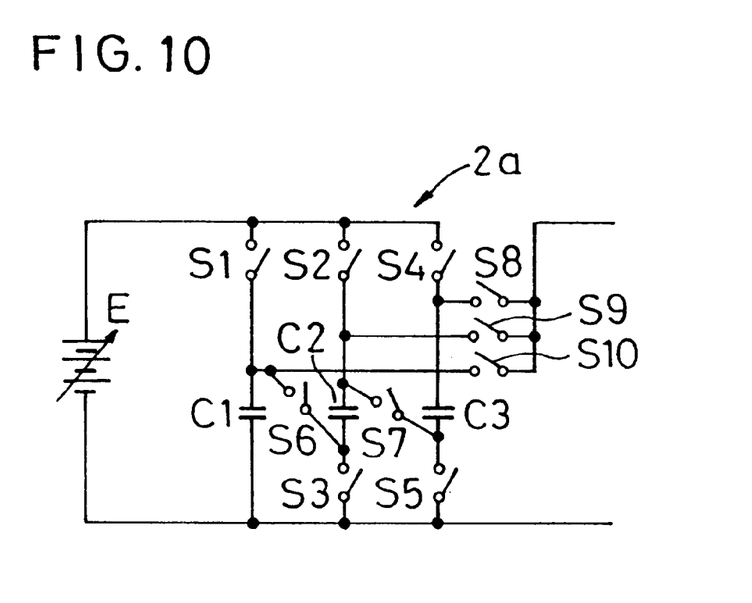
FIGS. 10 and 11 are partial circuit diagrams of other working aspects of the present invention, respectively.

In another working aspect shown in FIG. 10, the output voltage of the DC power source E in the working aspect of FIG. 1 is made variable. With a formation of this aspect, the applied voltage to the load 3 and piezo-electric transformer T2 can be varied by adjusting the both-end voltage of the DC power source E, and the formation is effective when, in particular, the applied voltage to the load 3 is to be decreased.

In decreasing the applied voltage to the load 3 or to the piezo-electric transformer T2, it is also possible to restrain the peak value of the output voltage of the first power source section 2a in series connection to be only twice as high as the both-end voltage of the DC power source E by controlling the switching elements S1–S10 with reducing the number of the capacitors, instead of varying the output voltage of the DC power source E. Other arrangements and operation are the same as those in the working aspect of FIG. 1.

Figure 11:
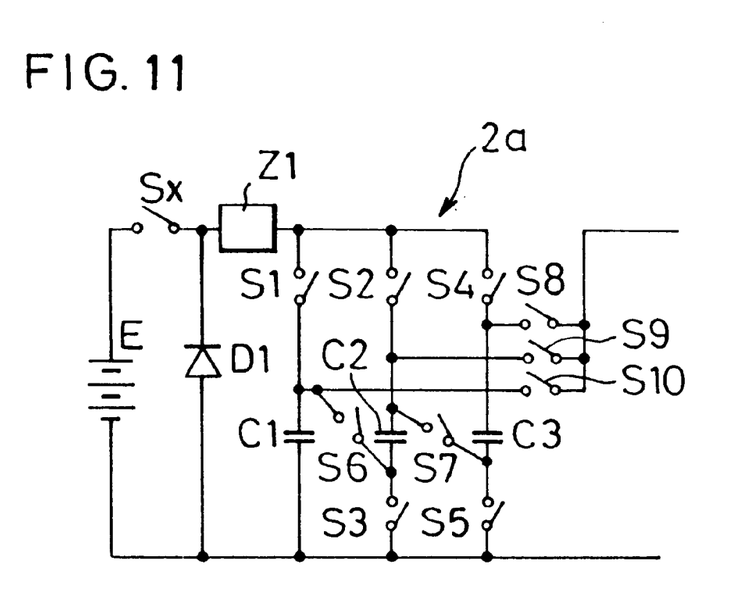
Figures 12A, 12B, 12C:
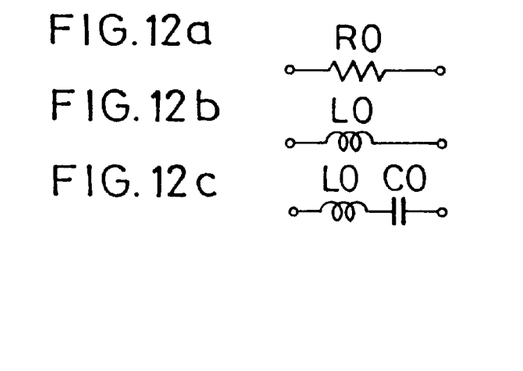

In another working aspect of the present invention shown in FIG. 11, a series circuit of a switching element Sx and impedance element Z1 is inserted between the DC power source E and the first power source section 2a, and a diode D1 is connected in inverse parallel to the series circuit of the switching element Sx and the DC power source E. In this formation, the switching element Sx is made ON in a period in which any one of the charging switching elements S1–S3 is ON, to have the capacitors C1–C3 charged through the impedance element Z1, and the both-end voltage of the capacitors C1–C3 can be made as a low voltage. Accordingly, it is made possible to control the output voltage of the first power source section 2a, by properly controlling the switching element Sx. For the impedance element Z1, any of such various ones as a resistor RO, an inductor LO and a series circuit of inductor LO and capacitor CO, as shown in FIGS. 12a–12c, may be employed. Other arrangement and operation are substantially the same as those in the working aspect of FIG. 1.

Figure 13:
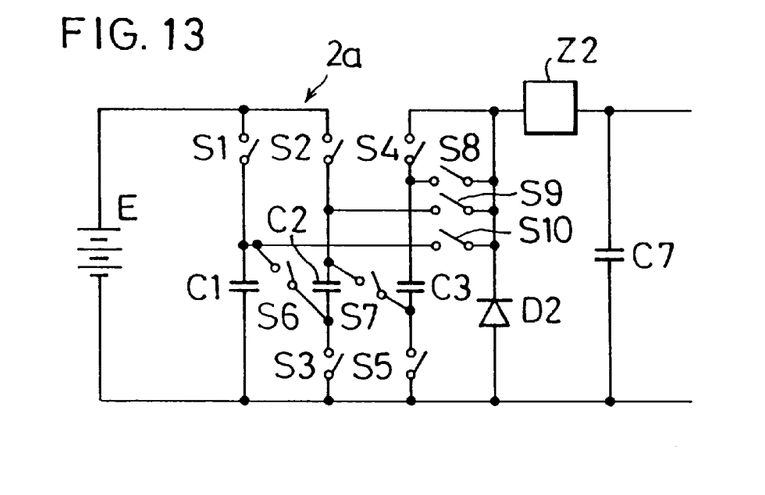
FIG. 13 is a partial circuit diagram of another working aspect of the present invention.

In another working aspect of the present invention as shown in FIG. 13, an impedance element Z2 is inserted between the first and second power source sections 2a and 2b in the working aspect of FIG. 1, a capacitor C7 is connected between the input terminals of the second power source section 2b, and a diode D2 is connected between output terminals of the first power source section 2a.

According to this formation, the impedance element Z2 is inserted in a discharging path of the capacitors C1–C3, so that the input voltage to the second power source section 2b can be made controllable, by properly controlling the ON period of the switching elements S8–S10. For the impedance element Z2 here, the same ones as in the aspect of FIG. 12 may be employed. Other arrangements and operation are the same as those in the working aspect of FIG. 1.

Figure 16:
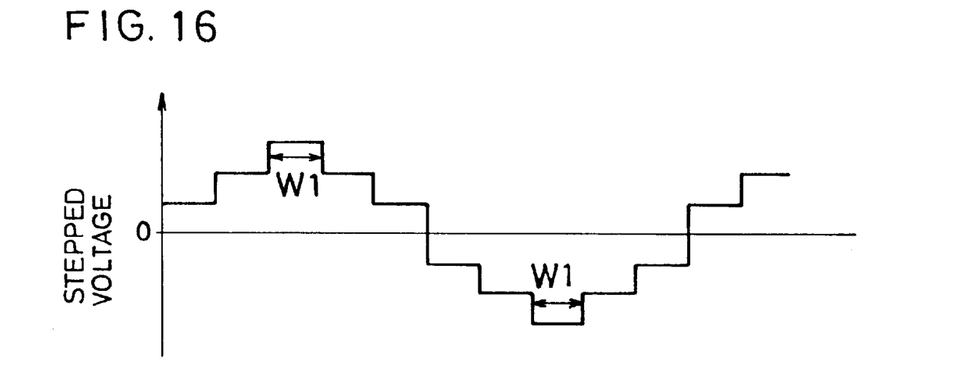
FIGS. 16 and 17 are explanatory diagrams for the operation in another working aspect of the present invention.

In a working aspect shown in FIG. 16, the formation is so made as to render the output voltage of the DC power source E to be constant. In the present working aspect, the circuit of FIG. 1 is employed, in which the applied voltage to the piezo-electric transformer T2 is of such discontinuous, stepped waveform, substantially sinusoidal AC waveform as a whole, as shown in FIG. 16. In this case, a control of ON period of the discharging switching elements S6–S8 causes periods W1 in which the stepped waveform shows the highest value in the absolute value of the voltage to be varied.

Figure 17:
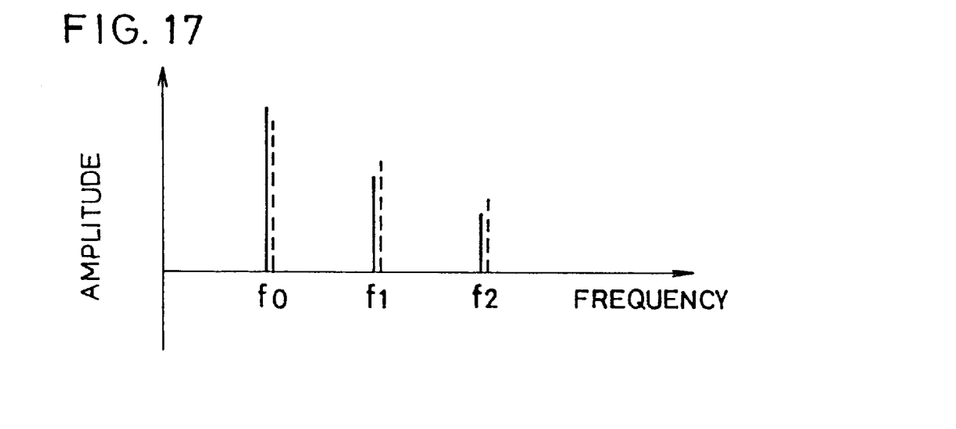

Here, it should be assumed that the stepped waveform shown in FIG. 16 is varied in a direction of shortening the period W1 from a state in which the waveform is the closest to the sinusoidal wave (a state in which the fundamental wave component contained in the stepped waveform becomes the largest). In this case, the high frequency component of the stepped waveform is to be enlarged. In other words, the whole energy per each cycle is decreased due to that the period W1 is shortened, and the fundamental component of the waveform is decreased, while the high frequency component of the waveform is increased. Assuming here that the stepped waveform is represented by the sum of components of an integer multiple of fundamental frequency which is the frequency of the fundamental component of the waveform (by means of Fourier transform or the like), the frequency component contained in the stepped waveform can be shown by a component ratio of the fundamental frequency f0 and the integer multiple components f1, f2, . . . . Assuming that the frequency component prior to the variation of the period W1 is in such relationship as shown by solid lines in FIG. 17, the period W1 varied to be shorter renders the frequency components of the waveform to vary to such relationship as shown by dotted lines in FIG. 17. While the solid lines and dotted lines are shown in the drawing as mutually deviated for easy understanding, it should be appreciated that these lines are respectively of the same frequency.

On the other hand, the path for supplying the power to the load 3 is provided with the piezo-electric transformer T2 functioning as the filter element so that, as the frequency component of the stepped waveform applied varies, the power passing through the piezo-electric transformer T2 will be caused to vary and eventually the supplied power to the load 3 will also be varied. In summary, it is made possible to control the supplied power to the load 3 only by controlling the timing of the switching elements without varying the output voltage of the DC power source E. As a result, it is enabled to easily control the supplied power to the load 3 without any enlargement of the device or any decreament in the power conversion efficiency. Other arrangements and operation are the same as those shown in the working aspect shown in FIG. 1.

Figure 18:
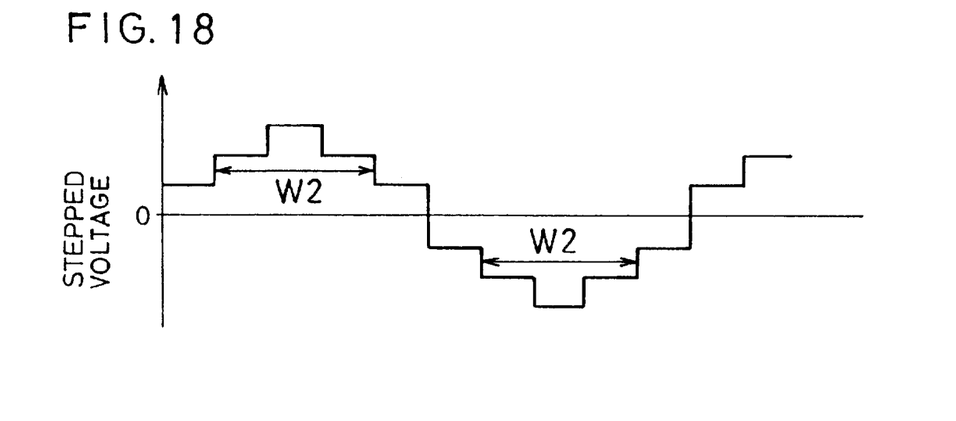
FIGS. 18–20 are explanatory diagrams for the operation in other working aspects of the present invention, respectively.
Figure 19:
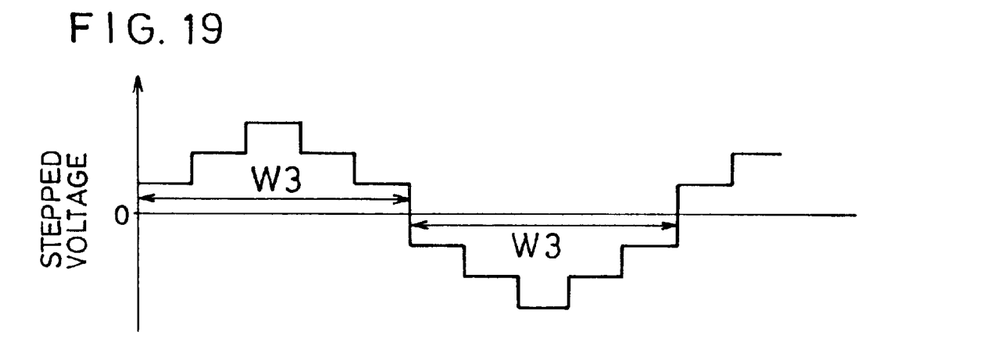
Figure 21:
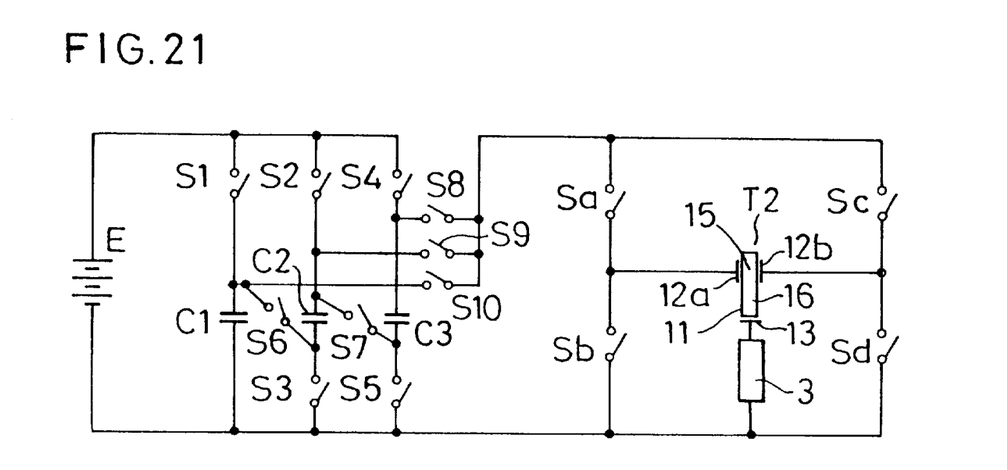
FIG. 21 is an explanatory diagram for the operation of another working aspect of the present invention.

In an arrangement of another working aspect of the present invention as shown in FIG. 21, the applied voltage V1 to the input terminals of the piezo-electric transformer T2 is made to be of a stepped waveform which varies in three steps. Here, it is possible to have only the intermediate voltage period W2 varied as shown in FIG. 18, or to have only the lowest voltage period W3 varied as shown in FIG. 19, among the three steps. In these cases, too, the supplied power to the load 3 can be controlled by controlling the respective periods W2 and W3.

Figure 20:
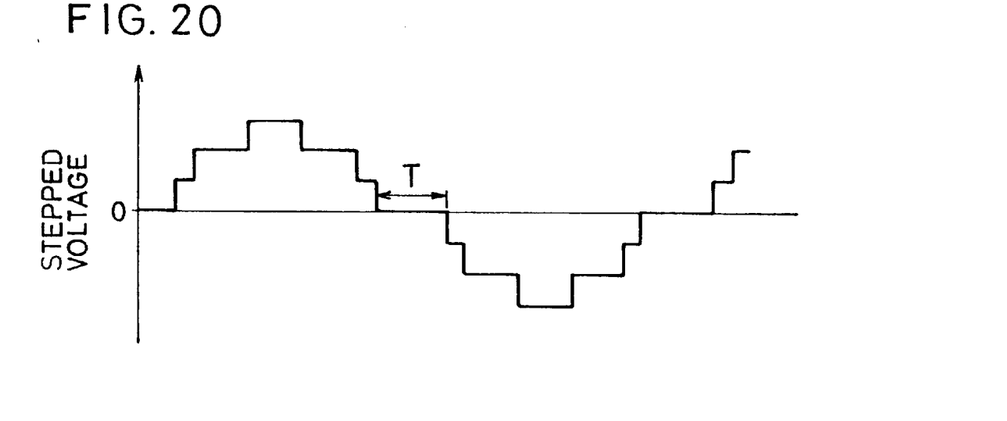

Further, in varying the period W3 of the lowest voltage, it may be also effective to provide the time T that the voltage of output is zero as shown in FIG. 20, before and after the polarity inversion. The frequency component ratio of the waveform can be varied also by varying this time T. Since this control can be realized only by a control of ON period of the switching element S9, the control is simplified.

In addition, the periods W1–W3 may also be controlled in any optional combination. Further, the change-over in the state of the respective switching elements S1–S10 forming the first power source needs not be at a constant time interval, but it is possible to properly vary the time interval. That is, while in FIG. 16 the half-cycle voltage waveform is shown to be symmetrical, it may be made to be also asymmetric.

It should be appreciated that, even with the use of a power source section of which the output voltage waveform is discontinuous, the voltage wave-form can be shaped substantially into a continuous waveform with a filter element employed, and it is enabled to apply any desired voltage to the load with the use of the voltage transforming element, without requiring any element of a high withstand voltage nor lowering the power conversion efficiency. As a result, a relatively small size power converting device can be provided.

In other words, the stepped waveform prevents any large and abrupt current from flowing instantaneously to the input capacitor of the piezo-electric transformer, and a larger number of the steps renders the current at every step to be smaller, and it is enabled to prevent the efficiency at this part from being lowered.

Since the piezo-electric transformer functions as the voltage transforming element, further, it is possible to apply a desired voltage to the load, without using any high withstand voltage element in the power source section and without lowering the power conversion efficiency. Consequently, it is possible to provide a power converting device of a relatively small size. Further, since the piezo-electric transformer can be used in common as the filtering element and voltage-transforming element, the device can be further minimized in size with the smaller number of parts. Since the output frequency of the power source section is rendered substantially in conformity to the natural oscillation of the generating section of the piezo-electric transformer, further, the piezo-electric transformer can be used at a high efficiency, and a high power conversion efficiency can be attained.

Further, as the electric energy passing through the filtering element is controlled through a control of the waveform of the output voltage of the power source section, it is not required to employ any special one for the power source section, and the supplied power to the load can be easily controlled only by employing a power source section of a circuit arrangement which can vary the output voltage waveform. As a result, it is made possible to control the supplied power to the load without enlarging in size the device nor lowering the power conversion efficiency.

In other words, the device is rendered to be capable of varying the frequency component ratio of the output voltage by controlling the operation timing of the switching elements.

What is claimed is:

1. A power converting device comprising:
   a power source section outputting an AC voltage of a stepped waveform having a plurality of voltage levels at least at a rising part, wherein the power source section comprises
a switched capacitor including a plurality of capacitors,
charging switching elements inserted in a charging path from a DC power source to the capacitors,
discharging switching elements inserted in a discharging path from the capacitors to a piezoelectric transformer,
a control circuit rendering the output voltage waveform to be a pulsating waveform varying stepwise by controlling ON/OFF timing of the charging and discharging switching elements; and
means for inverting the polarity of an output voltage of the switched capacitor in every cycle of the pulsating waveform;
the piezoelectric transformer electrically connected to said power source section shaping the stepped waveform of the output voltage of the power source section into a substantially continuous waveform and boosting and dropping the output voltage of the power source section; and
a load to which the output voltage is applied.

2. The device according to claim 1 wherein the power source section includes means for varying the frequency component ratio of the output voltage waveform.

3. The device according to claim 1 wherein the piezoelectric transformer has a resonance frequency set to be adjacent to a frequency of the output voltage of the device.

4. The device according to claim 3 wherein the piezoelectric transformer includes a driving section formed by disposing one end portion of a piezo-electric element between a pair of opposing input electrodes, and a generating section formed by disposing an output electrode to the other end of the piezo-electric element as separated by a predetermined distance from the driving section, an output frequency of the power source section being rendered substantially in conformity to a resonance frequency of the generating section.

5. The device according to claim 1 wherein the load is a discharge lamp, and the output voltage of the piezo-electric transformer is of a level capable of stably lighting and maintaining lighted state of the discharge lamp.

6. The device according to claim 1 wherein the output voltage of the power source section is variable.

7. A power converting device comprising:
a power source section for outputting an AC voltage of a stepped waveform having a plurality of voltage levels at least at rising part; and
a piezo-electric transformer including a driving section formed by disposing a piezo-electric element between a pair of opposing input electrodes, and a generating section formed by providing an output electrode to the piezo-electric element as separated from the driving section by a predetermined distance, for shaping the output voltage waveform of the power source section substantially into a continuous waveform and for voltage-converting the output voltage of the power source section;
the power source section comprising a switched capacitor including a plurality of capacitors, charging switching elements inserted in a charging path from a DC power source to the capacitors, discharging switching elements inserted in a discharging path from the capacitors to the piezo-electric transformer, and a control circuit for rendering the output voltage waveform to be a pulsating waveform varying stepwise by controlling ON/OFF timing of the charging and discharging switching elements; and
means for inverting the polarity of the output voltage of the switched capacitor at every cycle of the pulsating waveform;
the power source section having an output frequency being set substantially in conformity to a resonance frequency of the generating section of the piezo-electric transformer, and the output voltage of the power source section being applied through the piezo-electric transformer to a discharge lamp.

8. A power converting device comprising:
a power source section for outputting an AC voltage of a stepped waveform having a plurality of voltage levels at least at rising part; and
a piezo-electric transformer including a driving section formed by disposing a piezo-electric element between a pair of opposing input electrodes, and a generating section formed by providing an output electrode to the piezo-electric element as separated from the driving section by a predetermined distance, for shaping the output voltage waveform of the power source section substantially into a continuous waveform for voltage-converting the output voltage of the power source section to be appied to a load;
the power source section comprising a switched capacitor including a plurality of capacitors, charging switching elements inserted in a charging path from a DC power source to the capacitors, discharging switching elements inserted in a discharging path from the capacitors to the piezo-electric transformer, and a control circuit for rendering the output voltage waveform to be a pulsating waveform varying stepwise by controlling ON/OFF timing of the charging and discharging switching elements; and
an inverter circuit for inverting the polarity of the output voltage of the switched capacitor at every cycle of the pulsating waveform;
the output voltage of the device being varied in the frequency component ratio of the waveform by the ON/OFF timing control by the control circuit in the switched capacitor.

* * * * *